US010339846B2

United States Patent
Li et al.

(10) Patent No.: US 10,339,846 B2
(45) Date of Patent: Jul. 2, 2019

(54) DEVICE AND METHOD FOR CIRCUIT TESTING AND DISPLAY DEVICE APPLYING THE SAME

(71) Applicants: BOE TECHNOLOGY GROUP CO., LTD., Beijing (CN); FUZHOU BOE OPTOELECTRONICS TECHNOLOGY CO., LTD., Fujian (CN)

(72) Inventors: Dongxi Li, Beijing (CN); Weiqiang Li, Beijing (CN); Yabin Lin, Beijing (CN); Jianfeng Yuan, Beijing (CN)

(73) Assignees: BOE TECHNOLOGY GROUP CO., LTD., Beijing (CN); FUZHOU BOE OPTOELECTRONICS TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 15/720,086

(22) Filed: Sep. 29, 2017

(65) Prior Publication Data
US 2018/0240384 A1    Aug. 23, 2018

(51) Int. Cl.
G09G 3/00 (2006.01)
G09G 3/36 (2006.01)
G02F 1/13 (2006.01)

(52) U.S. Cl.
CPC ........... G09G 3/006 (2013.01); G02F 1/1309 (2013.01); G09G 3/3648 (2013.01)

(58) Field of Classification Search
CPC .... G01R 31/021; G01R 31/045; G01R 1/025; G01R 31/008; G01R 31/1272;
(Continued)

(56) References Cited

U.S. PATENT DOCUMENTS 5,072,185 A * 12/1991 Rockwell ............. G01R 31/021
29/593
5,546,013 A * 8/1996 Ichioka .................. G09G 3/006
324/760.02
(Continued)

FOREIGN PATENT DOCUMENTS

CN    101285864 A    10/2008
CN    101308264 A    11/2008
(Continued)

OTHER PUBLICATIONS

First Office Action for Chinese Patent Application No. 201710099869.X dated Jan. 23, 2019.

*Primary Examiner* — Vinh P Nguyen
(74) *Attorney, Agent, or Firm* — Calfee, Halter & Griswold LLP

(57) ABSTRACT

The present disclosure provides a device and method for circuit testing and a display device applying the same. The device for circuit testing includes a detection circuit configured to detect whether a display panel and a printed circuit board are electrically conductive, wherein the detection circuit includes: a first metal redundant track configured to input an electrical detection signal; a second metal redundant track bonded to the first metal redundant track via a first anisotropic conductive film; a third metal redundant track electrically connected to the second metal redundant track; and a fourth metal redundant track bonded to the third metal redundant track via a second anisotropic conductive film.

17 Claims, 4 Drawing Sheets

(58) Field of Classification Search
CPC ........ G01R 31/14; G01R 31/36; G01R 31/40;
G01R 15/12; G01R 31/00; G01R 31/023;
G01R 31/025; G01R 31/041; G01R
31/2805; G01R 31/318508; G01R
31/318544; G01R 31/318558; G01R
31/2884; G01R 1/0416; G01R 1/0735;
G01R 31/2831; G01R 31/2889; G01R
31/31905; H01R 43/28; G06F 11/263;
G09G 2300/026; G09G 2300/0804; G09G
2320/02; G09G 2320/0242; G09G
2320/0266; G09G 3/00; G09G 3/2003;
G09G 2330/12; G09G 3/006; G09G
3/3611; H02J 7/0021; H02J 7/0047;
H01L 2224/73204; H01L 2224/83192;
H01L 23/4985; H01L 2224/48227; H01L
2224/48465; H01L 23/481; H01L
2224/16227; H01L 24/81; H01L 2224/13;
H01L 2224/83101; H01L 23/057; H01L
24/48; H01L 2224/0401; H01L
2224/4824; H01L 2224/4903; H01L
24/13; H01L 24/29; H01L 24/31; H01L
24/83; H01L 2224/1134; H01L
2224/13009; H01L 2224/73104; H01L
2224/75; H01L 2224/81191; H01L
23/538; H01L 2224/13023; H01L
2224/16; H01L 22/34; H01L 24/16; H01L
24/24; H01L 24/45; H01L 24/73; H01L
2924/16235; G02F 1/13452; G02F
2001/136281; G02F 1/1309
USPC ........................................................ 324/500
See application file for complete search history.

(56) References Cited

U.S. PATENT DOCUMENTS

| | | | | |
|---|---|---|---|---|
| 6,462,556 | B2* | 10/2002 | Yamashita | G01R 1/07385 |
| | | | | 324/537 |
| 2002/0163342 | A1* | 11/2002 | Ishioka | G01R 31/2805 |
| | | | | 324/527 |
| 2014/0117998 | A1 | 5/2014 | Hwang et al. | |

FOREIGN PATENT DOCUMENTS

| | | |
|---|---|---|
| CN | 202815143 U | 3/2013 |
| CN | 104200767 A | 12/2014 |
| CN | 105632382 A | 6/2016 |
| CN | 105676047 A | 6/2016 |
| JP | 2000162260 A | 6/2000 |

\* cited by examiner

DEVICE AND METHOD FOR CIRCUIT TESTING AND DISPLAY DEVICE APPLYING THE SAME

CROSS REFERENCE

The present application is based upon and claims priority to Chinese Patent Application No. 201710099869.x, filed on Feb. 23, 2017, and the entire contents thereof are incorporated herein by reference.

TECHNICAL FIELD

The present disclosure relates to a field of display technology, particularly, to a device and method for circuit testing and a display device applying the same.

BACKGROUND

In a liquid crystal display device, correspondingly connecting tracks (wirings) in the display panel are with tracks in the flexible printed circuit board (hereafter as PFC board) one to one is referred to as "bonding".

It is noted that the above disclosed information is merely used for readily understanding the background of the present disclosure, and thus the information that is not well-known to a person skilled in the art can be included herein.

SUMMARY

The present disclosure provides technical solutions as follow.

The first aspect of the present disclosure provides a device for circuit testing, including a detection circuit configured to detect whether a first bonding portion and a second bonding portion are electrically conductive, wherein the detection circuit includes:

a first metal redundant track configured to input an electrical detection signal;

a second metal redundant track bonded to the first metal redundant track;

a third metal redundant track electrically connected to the second metal redundant track; and a fourth metal redundant track bonded to the third metal redundant track, which is configured to output an electrical feedback signal when the first bonding portion and the second bonding portion are electrically conductive, wherein the first metal redundant track and the fourth metal redundant track is disposed within the second bonding portion, and the second metal redundant track and the third metal redundant track is disposed within the first bonding portion.

Based upon the above technical solution concerning the device for circuit testing, the second aspect of the present disclosure provides a method for circuit testing, including:

selecting a first metal redundant track and a fourth metal redundant track in a second bonding portion, selecting a second metal redundant track bonded to the first metal redundant track and a third metal redundant track bonded to the fourth metal redundant track in a first bonding portion, and electrically connecting the second metal redundant track to the third metal redundant track, so as to form a detection circuit;

inputting an electrical detection signal to the first metal redundant;

if the fourth metal redundant track outputs an electrical feedback signal when the electrical detection signal flows through the detection circuit, the first bonding portion and the second bonding portion being electrically conductive; or if the fourth metal redundant track does not output an electrical feedback signal when the electrical detection signal is input to the first metal redundant track, the first bonding portion and the second bonding portion being not electrically conductive.

Based upon the above technical solution concerning the device for circuit testing, the third aspect of the present disclosure provides a display device.

It is appreciated that the general description above and the detailed description as follow are exemplary and illustrative which do not intend to limit to the scope of the present disclosure.

The summary of the technical implementations and examples described in this section does not include the entire content of the present disclosure and does not equal to the whole scope to be protected of the present disclosure.

BRIEF DESCRIPTION OF THE DRAWINGS

Figures described herein, which constitute a part of the present disclosure, are used for further understanding to the present disclosure. The exemplary and illustrative embodiments of the present disclosure are used for explanation to the present disclosure, which do not intend to limit to the present disclosure, wherein.

| Reference Number | |
|---|---|
| 1—display panel | 11—glass substrate |
| 12—other functional layers | 13—insulating firm layer |
| 14—metal track in the display panel | 2—conductive particles |
| 3—printed circuit board | 31—substrate |
| 32—metal track in the printed circuit board | 111—glass boundary |
| 4—bonding alignment marker | 5—metal available track |

-continued

| Reference Number | |
|---|---|
| 6—detection circuit | 61—first metal redundant track |
| 62—first anisotropic conductive film | 63—second metal redundant track |
| 64—third metal redundant track | 65—second anisotropic conductive film |
| 66—fourth metal redundant track | 7—detecting controller |
| 8—status indicator | 9—display controller |

DETAILED DESCRIPTION

In order to further describe the device and method for circuit testing and the display device applying the same provided by the embodiments of the present disclosure, description will be illustrated with reference to the accompanying figures hereafter.

Figure 1:
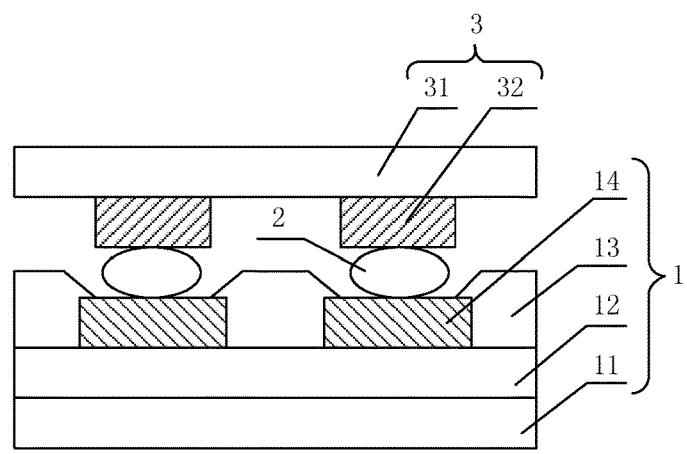
FIG. 1 is a schematic diagram illustrating a normal bonding structure of a circuit according to one embodiment of the present disclosure.

In one embodiment of the present disclosure as shown in FIG. 1, when a circuit bonding is conducted in a liquid crystal display device, firstly, the surface of the metal track 14 in the display panel 1 which is not covered by the insulating film layer 13 and opposite to the metal track 32 in the printed circuit board 3 are coated with an anisotropic conductive film (ACF). Subsequently, hot compressive deformation of conductive particles 2 in ACF is conducted with high temperature and high pressure, and conductive particles 2 in deformed ACF having a circle shape are contacted with the metal tracks respectively disposed on both sides thereof with sufficient contact area to make these metal tracks be electrically connected with each other, such that corresponding connection of the metal tracks in the bonding area can be realized; finally, conductive particles 2 in ACF are solidified to maintain the connection of the metal tracks in the bonding area.

Figure 2:
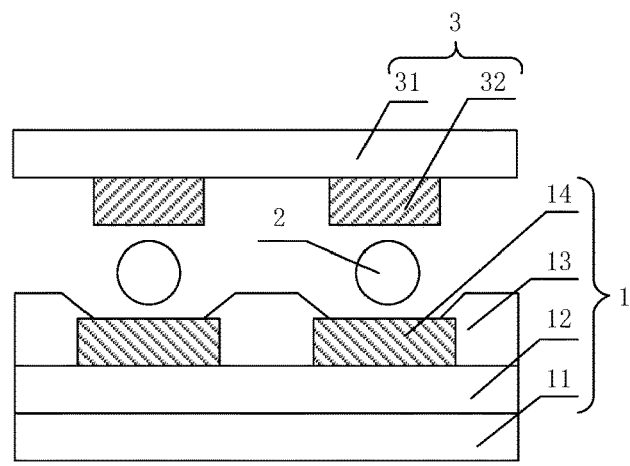
FIG. 2 is a schematic diagram illustrating an abnormal bonding structure of a circuit according to one embodiment of the present disclosure.

However, the connection of the metal tracks in the bonding area depends on hot compressive deformation of conductive particles 2 in ACF. As shown in FIG. 2, the metal track 14 in the display panel disposed on one side of the conductive particles 2 and the metal track 14 in the display panel disposed on one side of the conductive particles 2 cannot be electrically connected with each other (i.e., they are not electrically conductive) via the conductive particles 2 if the hot compressive deformation of conductive particles 2 in ACF is abnormal, for example, the hot compressive deformation of conductive particles 2 is insufficient such that the conductive particles 2 cannot contact the metal track 14 and the metal track 32 simultaneously or the contact area therebetween is insufficient, thereby a higher contact resistance may be produced at the conductive particles 2. In this case, once a relative strong instantaneous current flows through the conductive particles 2, it is likely to damage the conductive particles 2, the metal track 14 and the metal track 32, or even the insulating firm layer 13 and other functional layers 12 disposed in an area corresponding to the area where the metal track 14 in the display panel is disposed, the substrate 31 disposed in a surrounding area of the metal track 32 in the printed circuit board 3, or the like, which may result in damaging of the liquid crystal display device.

Figure 3:
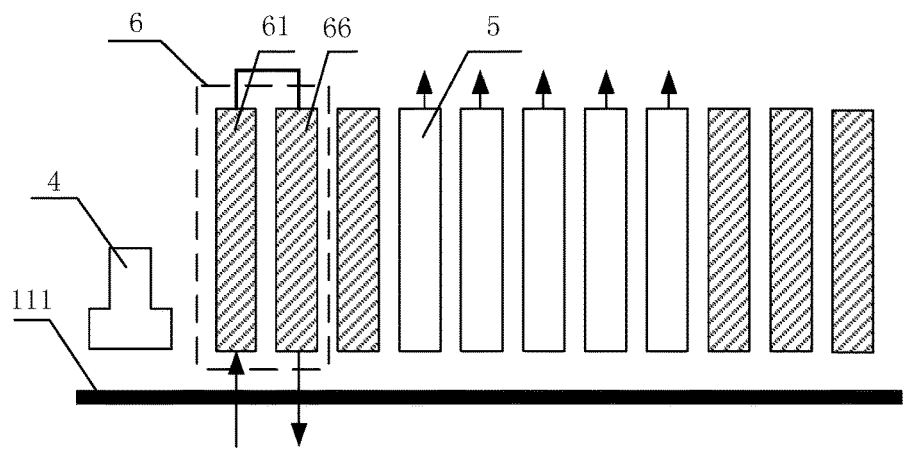
FIG. 3 is a schematic diagram illustrating a circuit structure of a bonding area in a display device according to an embodiment of the present disclosure.
Figure 4:
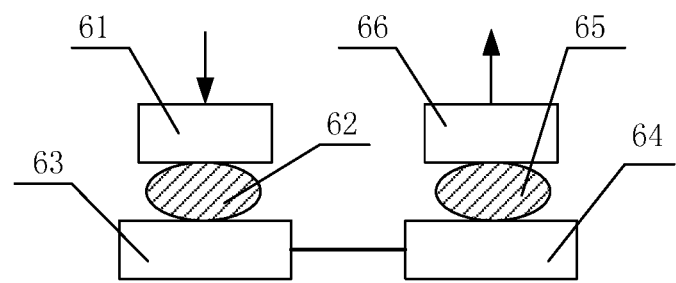
FIG. 4 is a schematic diagram illustrating a structure of a detection circuit according to an embodiment of the present disclosure.

Referring to FIGS. 1, 3 and 4, a device for circuit testing provided by the embodiment of the present disclosure includes a detection circuit 6 configured to detect whether a first bonding portion is electrically connected with a second bonding portion, i.e., whether the first bonding portion and the second bonding portion are electrically conductive, wherein the detection circuit includes:

a first metal redundant track 61 configured to input an electrical detection signal;

a second metal redundant track 63 bonded to the first metal redundant track 61;

a third metal redundant track 64 electrically connected to the second metal redundant track 63; and a fourth metal redundant track 66 bonded to the third metal redundant track 64, which is configured to output an electrical feedback signal when a display panel is electrically connected with a printed circuit board, wherein the first metal redundant track 61 and the fourth metal redundant track 66 is disposed within the second bonding portion, and the second metal redundant track 63 and the third metal redundant track 64 is disposed within the first bonding portion.

It is noted that the first bonding portion and the second bonding portion may be any pair of track bonding structures which may be bonded to each other and the bonding medium therebetween may be a anisotropic conductive film or other conductive medium such as a conducting resin having the similar property with that of the anisotropic conductive film. In the device for circuit testing provided by embodiments of the present disclosure below, the technical solutions of the present disclosure will be described in detail by the example of which the first bonding portion and the second bonding portion serve as a display panel and a printed circuit board respectively.

Referring to FIG. 3, it is appreciated that a plurality of metal tracks and a bonding alignment marker 4 are disposed within the glass boundary 111 of the existing display panel. As for these metal tracks, the metal tracks connected with the display circuit, the driving circuit and the like in the display panel 1 are referred to as metal available tracks, and the dummy metal tracks which are off duty are referred to as metal redundant tracks. When it is need to correspondingly bond the metal tracks in the display panel with the metal tracks in the printed circuit board, the metal available tracks and the metal redundant tracks in the display panel may be bonded to the corresponding the metal tracks in the printed circuit board one to one.

Referring to FIG. 4, in the exemplary embodiment, the first metal redundant track is bonded to the second metal redundant track via a first anisotropic conductive film and the third metal redundant track is bonded to the fourth metal redundant track via a second anisotropic conductive film. It is noted that the type of the first anisotropic conductive film 62 and the type of the second anisotropic conductive film 65 are identical, and the adjective words such as "first", "second" are used to clearly describe the connection relation among the first metal redundant track 61, the second metal redundant track 63, the third metal redundant track 64 and the fourth metal redundant track 66, that is, the anisotropic conductive film configured to bond the first metal redundant track 61 to the second metal redundant track 63 is referred to as the first anisotropic conductive film 62, and the anisotropic conductive film configured to bond the third metal redundant track 64 to the fourth metal redundant track 66 is referred to as second anisotropic conductive film 65.

Unless otherwise stated, such words are not intended to imply any substantial limitation to the scope of the present disclosure.

In the embodiment, the detection circuit 6 formed by sequential connection of the first metal redundant track 61, the first anisotropic conductive film 62, the second metal redundant track 63, the third metal redundant track 64, the second anisotropic conductive film 65 and the fourth metal redundant track 66 may be acquired using the first metal redundant track 61 and the fourth metal redundant track 66 originally existed in the printed circuit board, the connection structure of which the first metal redundant track 61 is bonded to the second metal redundant track 63 via a first anisotropic conductive film 62 and the connection structure of which the fourth metal redundant track 66 is bonded to the third metal redundant track 64 via a second anisotropic conductive film 65 originally existed in the display panel and the electrical connection of the second metal redundant track 63 with the third metal redundant track 64.

Particularly, the first metal redundant track 61 serves as an input terminal of the electrical detection signal, the fourth metal redundant track 66 serves as a feedback output terminal of the electrical detection signal. If the fourth metal redundant track 66 outputs an electrical feedback signal when the electrical detection signal is input to the first metal redundant track 61, the display panel 1 is electrically connected with the printed circuit board 3, that is, the metal tracks in the bonding areas of the display panel 1 and the printed circuit board 3 are electrically connected with each other one to one, otherwise, the display panel 1 is electrically disconnected with the printed circuit board 3. In the present disclosure, the terms "electrically disconnected" or "not electrically conductive" may refer to the case where the two parts are electrically insulated from one another, while the present disclosure is not limited thereto. In some embodiments, the above terms may refer to the case where the two parts are not in proper electrical connection, e.g, the electrical resistance therebetween is higher than an allowed value, or the fading of the signal from one part to the other one exceeds a required range.

Based upon the above, the device for circuit testing provided by the embodiment of the present disclosure is capable of detecting the electrical connection state between the display panel 1 and the printed circuit board 3 with the detection circuit 6 before the display function of display device is activated, and the electrical connection of the display panel 1 and the printed circuit board 3 depends on whether the metal tracks in the bonding areas of the display panel 1 and the printed circuit board 3 are normally bonded to each other one to one, that is, the device for circuit testing provided by the present disclosure is capable of determining, with an electrical detection signal, whether the metal tracks in the bonding areas of the display panel 1 and the printed circuit board 3 are normally bonded to each other one to one, and ensuring that the display device operates in the case when the display panel 1 and the printed circuit board 3 are electrically connected with each other, according to a testing result acquired from the device for circuit testing, thereby avoiding the display device to be operated in the case when the display panel 1 and the printed circuit board 3 are not in proper electrical connection with each other and avoiding damage caused in that case.

In addition, the device for circuit testing provided by the embodiment of the present disclosure forms a detection circuit with the metal redundant tracks which are correspondingly bonded and originally disposed in the display penal and the printed circuit board of the display device, and is capable of effectively detecting the electrical connection state of the metal tracks in the bonding areas of the display panel and the printed circuit board without adding any additional external circuit, thereby simplifying the structure of the device for circuit testing and reducing the occupied space of the display device in which the device for circuit testing is disposed.

Figure 5:
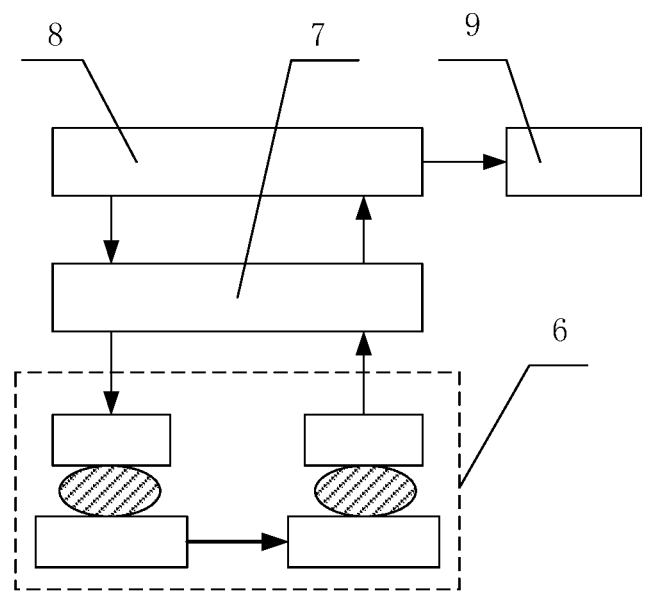
FIG. 5 is a schematic diagram illustrating a structure of a device for circuit testing according to an embodiment of the present disclosure.

Referring to FIG. 5, the device for circuit testing provided by the embodiment of the present disclosure further includes a detecting controller 7 for facilitating the user to use the above device for circuit testing and accurately testing whether the metal tracks in the bonding areas of the display panel and the printed circuit board are normally bonded to each other one to one. The detecting controller 7 is electrically connected to the first metal redundant track 61 and the detecting controller 7 is configured to output the electrical detection signal to the first metal redundant track 61 before the display device is activated. The detecting controller 7 is also electrically connected to the fourth metal redundant track 66, and the detecting controller 7 is configured to when the display panel 1 is electrically connected with the printed circuit board 3, receive the electrical feedback signal output by the fourth metal redundant track 66 and determine whether the electrical feedback signal is satisfied with a requirement for the standard detecting signal; if satisfied, the detecting controller 7 outputs a circuit testing result indicating that the display panel 1 is electrically connected with the printed circuit board 3, if not satisfied or the electrical feedback signal is not received by the detecting controller 7 during a predetermined time period, the detecting controller 7 outputs a circuit testing result indicating that the display panel 1 is electrically disconnected with the printed circuit board 3, and wherein the standard detecting signal is an output signal generated when the electrical detection signal is faded within an allowable range.

In an exemplary embodiment, the detecting controller 7 includes a microprocessor and a power management module electrically connected to the microprocessor. The microprocessor may be a single chip microcomputer and is electrically connected to the fourth metal redundant track in the detection circuit 6, and the power management module is electrically connected to the first metal redundant track in the detection circuit 6.

Particularly, if the circuit needs to be tested, the microprocessor sends a detection trigger signal to the power management module and subsequently the power management module sends an electrical detection signal to the first metal redundant track in the detection circuit 6 according to the detection trigger signal. If the electrical feedback signal output from the fourth metal redundant track 66 is not received by the microprocessor during a predetermined time period, or the electrical feedback signal is received by the microprocessor but is not satisfied with a requirement for the standard detecting signal, the microprocessor outputs a testing result indicating that the display panel is electrically disconnected with the printed circuit board; if the electrical feedback signal output from the fourth metal redundant track 66 is received by the microprocessor during a predetermined time period and is satisfied with the requirement for the standard detecting signal, the microprocessor outputs a testing result indicating that the display panel is electrically connected with the printed circuit board.

It is noted that although the metal tracks of the display panel 1 and the printed circuit board 3 are normally bonded to each other via anisotropic conductive film, the electrical signal may be faded within a certain range after flowing through the normally bonded metal tracks. Therefore, a person skilled in the art can determine the corresponding standard detecting signal according to the allowable range within which the electrical detection signal is faded after flowing through the normally bonded metal tracks. If the electrical feedback signal output by the fourth metal redundant track 66 is not satisfied with the requirement for the standard detecting signal, the electrical feedback signal has been faded excessively, in this case, the contact resistance between the metal tracks in the display panel 1 and the printed circuit board 3 is relative high. That is, the metal tracks in the display panel 1 and the printed circuit board 3 are bonded to each other in abnormal and the display panel 1 is electrically disconnected with the printed board 3.

Referring to FIG. 5, the device for circuit testing provided by the embodiment of the present disclosure further includes a status indicator 8 signally communicated with the detecting controller 7 for achieving the automated detection of the device for circuit testing. The status indicator 8 is configured to identify the display status of the display device, and send a circuit detection request signal to the detecting controller 7 before display function of the display device is activated, such that the detecting controller 7 outputs the electrical detection signal according to the circuit detection request signal. The status indicator 8 is further configured to receive the circuit testing result output by the detecting controller 7.

In an exemplary embodiment, the status indicator 8 may include a timing control chip. The control of the timing control chip corresponds to the different status of the display device and the timing control chip is capable of sequentially controlling the display device in time. The timing control chip controls the detection circuit 6 quickly and accurately to perform detection before display function of the display device is activated (i.e., the display function of the display panel of the display device is activated), which facilitates to improve the detection speed and accuracy of the device for circuit testing.

In addition, in the above embodiment as shown in FIG. 5, the status indicator 8 is further signally communicated with a display controller 9 and configured to output a display activation trigger signal to the display controller 9 when a circuit testing result indicating that the display panel 1 is electrically connected with the printed circuit board 3 is received, such that the display controller 9 controls display function of a display device to be activated. When the device for circuit testing provided by the embodiment is provided in a display device, the device for circuit testing is capable of determining whether the metal tracks in the display panel and the printed circuit board are normally bonded to each other one to one before display function of the display device is activated every time, and activating display function of the display device after the testing result indicating that the display panel is electrically connected with the printed circuit board is received, thereby ensuring that the display device can be used safely, reducing the possibility of which the display device is used in the case when the metal tracks are not normally bonded to each other, and improving the convenience for user.

It is noted that the display controller 9 may be realized by the power management module in the detecting controller 7. Specially, the status indicator 8 sends a display activation trigger signal to the power management module, and the power management module supplies power to the display panel to activate display function of the display panel according to the display activation trigger signal.

In another embodiment, the status indicator is configured to output a corresponding signal for indicating that the display device needs to be maintained when the testing result indicating that the display panel is electrically disconnected with the printed circuit board, such that the display device can be maintained by the user in time, which ensures that the display device can be used safely. As an example, the status indicator may be a timing control chip. When the testing result indicating that the display panel is electrically disconnected with the printed circuit board is received by the timing control chip, the pin of the timing control chip, which is electrically connected to a maintenance indicator, outputs a high level to indicate that the maintenance needs to be performed for the display device.

In the above embodiment, the detecting controller 7, the status indicator 8 and the display controller 9 may be formed integrally or separately. In the embodiment, the detecting controller 7, the status indicator 8 and the display controller 9 are integrated in the printed circuit board 3, which results in that the occupied space of the display device in which the device for circuit testing is disposed can be reduced and the connection among the components of the device for circuit testing can be facilitated.

In order to ensure that the stable and safe detection can be perform on the bonding relation between the display panel and the printed circuit board with the device for circuit testing, as illustrated in the above embodiment, the detecting controller 7 outputs, to the first metal redundant track 61, an instantaneous electrical pulse signal as the electrical detection signal. The instantaneous electrical pulse signal may be an instantaneous pulse voltage signal or an instantaneous pulse current signal. The amplitude and frequency of the instantaneous electrical pulse signal may be determined by a person skilled in the art as needed while using the instantaneous electrical pulse signal as the electrical detection signal. Thus, by virtue of the instantaneous variation characteristic of the instantaneous electrical pulse signal, when the display panel is electrical disconnected with the printed circuit board (i.e., the metal tracks in the display panel and the printed circuit board are not normally bonded to each other), it is possible to ensure effective transmission of the electrical detection signal in the detection circuit while avoiding damage to the detection circuit caused by the electrical detection signal and the damage to the detection circuit. In addition, even when the detection circuit is damaged due to the electrical detection signal, since the detection circuit is formed of the metal redundant tracks in the display panel and the printed circuit board, the metal available tracks in the display panel and other film layers disposed correspondingly will not be damaged, thereby preventing damage to the display device.

Figure 6:
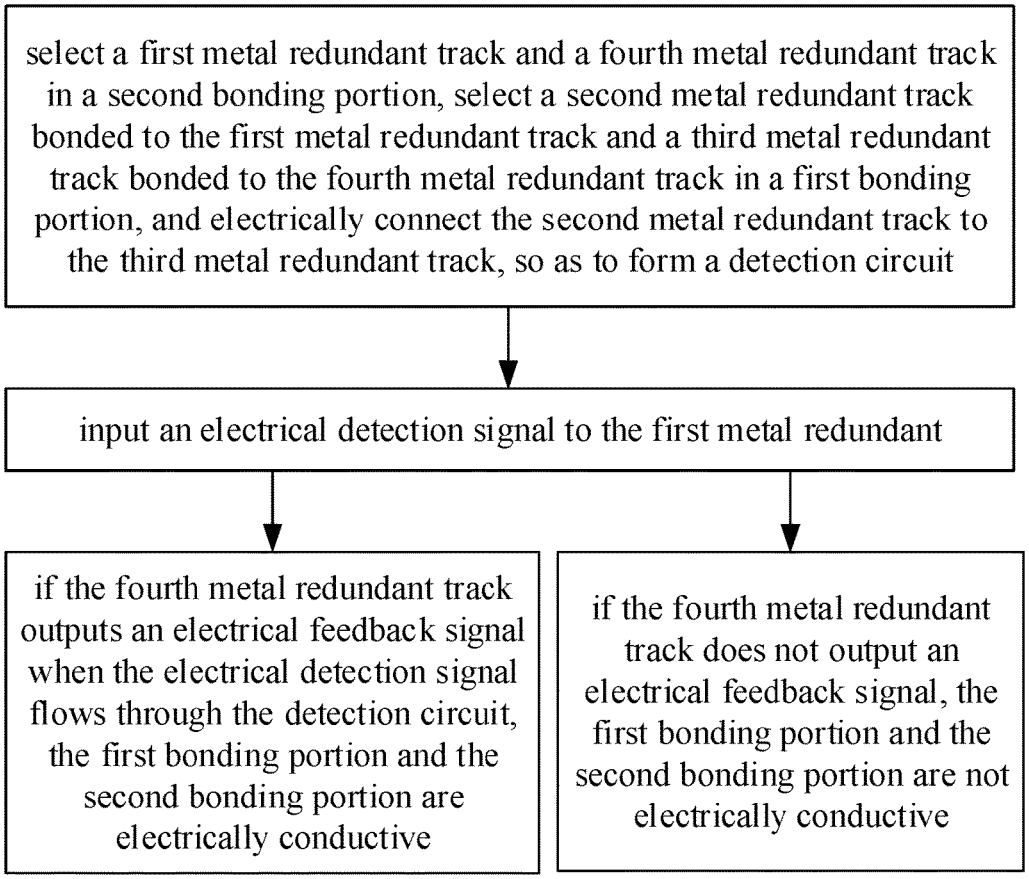
FIG. 6 is a flow chart illustrating a method for circuit testing according to an embodiment of the present disclosure.

Referring to FIG. 6, the embodiment of the present disclosure further provides a method for circuit testing, including:

selecting a first metal redundant track and a fourth metal redundant track in a second bonding portion, selecting a second metal redundant track bonded to the first metal redundant track and a third metal redundant track bonded to the fourth metal redundant track in a first bonding portion, and electrically connecting the second metal redundant track to the third metal redundant track, so as to form a detection circuit;

inputting an electrical detection signal to the first metal redundant;

if the fourth metal redundant track outputs an electrical feedback signal when the electrical detection signal flows through the detection circuit, the first bonding portion being electrically connecting with the second bonding portion, i.e., the first bonding portion and the second bonding portion being electrically conductive; or if the fourth metal redundant track does not output an electrical feedback signal when the electrical detection signal is input to the first metal redundant track, the first bonding portion being electrically disconnected with the second bonding portion, i.e., the first bonding portion and the second bonding portion being not electrically conductive.

As compared with the prior art, the advantageous effects of the method for circuit testing provided by the present disclosure is the same as that of the device for circuit testing provided by the present disclosure, and the repeated descriptions are omitted.

In the method for circuit testing provided by the present disclosure, the first bonding portion is a display panel and the second bonding portion is a printed circuit board, and the detailed description will be illustrated by the example of which the first metal redundant track is bonded to the second metal redundant track via a first anisotropic conductive film and the third metal redundant track is bonded to the fourth metal redundant track via a second anisotropic conductive film. In the exemplary embodiment, the first bonding portion being electrically connected with the second bonding portion indicates the case where the display panel being electrically connected with the printed circuit board; and the first bonding portion being electrically disconnected with the second bonding portion indicates the case where the display panel being electrically disconnected with the printed circuit board.

Figure 7:
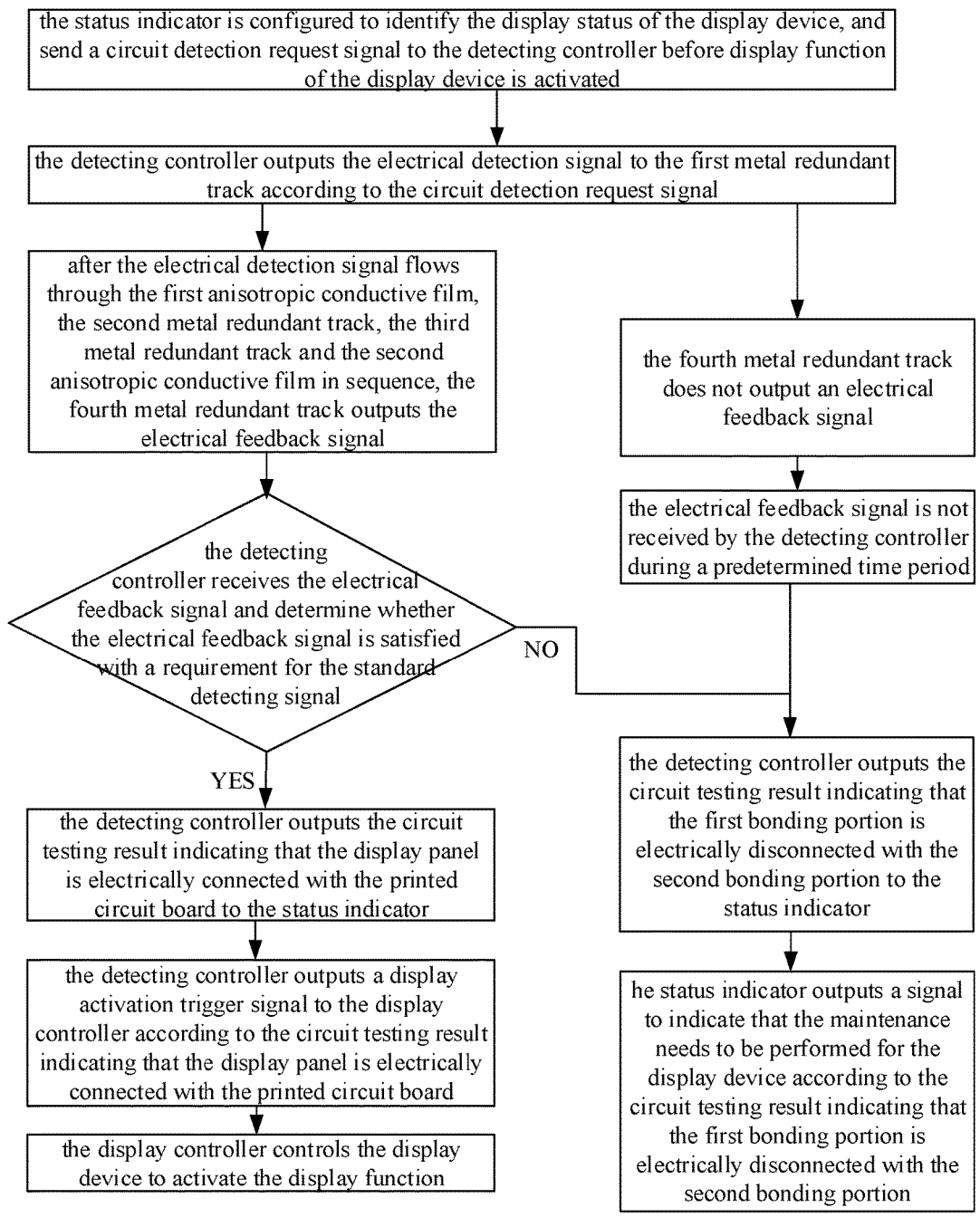
FIG. 7 is another flow chart illustrating a method for circuit testing according to an embodiment of the present disclosure.

Referring to FIGS. 5 and 7, in the method for circuit testing provided by the embodiment, the first metal redundant track 61 and the fourth metal redundant track 66 are electrically connected to a detecting controller 7, and the detecting controller inputs the electrical detection signal to the first metal redundant track before display function of the display device is activated;

when the electrical detection signal flows through the detection circuit 6, the detecting controller 7 receives the electrical feedback signal output by the fourth metal redundant track and determines whether the electrical feedback signal is satisfied with a requirement for the standard detecting signal;

if satisfied, the detecting controller 7 outputs a circuit testing result indicating that the display panel is electrically connected with the printed circuit board;

if not satisfied or the electrical feedback signal is not received by the detecting controller 7 during a predetermined time period, the detecting controller 7 outputs a circuit testing result indicating that the first bonding portion is electrically disconnected with the second bonding portion, and wherein the standard detecting signal is an output signal generated when the electrical detection signal is faded within an allowable range.

Referring to FIGS. 5 and 7 again, in the method for circuit testing provided by the embodiment, the detecting controller 7 is signally communicated with a status indicator 8; the status indicator 8 is configured to identify a display status of the display device and send a circuit detection request signal to the detecting controller 7 before display function of the display device is activated, such that the detecting controller 7 outputs the electrical detection signal according to the circuit detection request signal; and the detecting controller 7 is configured to output the circuit testing result to the status indicator 8.

In the above embodiment, the status indicator is further signally communicated with a display controller for ensuring that the display device can be used safely, reducing the possibility of which the display device is used in the case when the metal tracks are bonded to each other in abnormal, and improving the convenience for user. The status indicator outputs a display activation trigger signal to the display controller when a circuit testing result indicating that the display panel is electrically connected with the printed circuit board is received, such that the display controller controls display function of a display device to be activated. Similarly, in the embodiment, the status indicator may also output a corresponding maintenance indicator, such that the display device can be maintained by the user in time to ensure that the display device can be used safely.

It is noted that the electrical detection signal is an instantaneous electrical pulse signal in the method for detecting whether the display panel is electrically connected with the printed circuit board. The amplitude and frequency of the instantaneous electrical pulse signal may be determined by a person skilled in the art as needed. Thus, by virtue of the instantaneous variation characteristic of the instantaneous electrical pulse signal, when the display panel is electrical disconnected with the printed circuit board (i.e., the metal tracks in the display panel and the printed circuit board are not normally bonded to each other), it is possible to ensure effective transmission of the electrical detection signal in the detection circuit while avoiding damage to the detection circuit caused by the electrical detection signal and ensuring that the circuit testing device may test the bonding between the display panel and the print circuit board stably and safely.

The embodiment of the present disclosure further provides a display device, which includes the device for circuit testing provided by the embodiment as described above. The advantageous effects of the device for circuit testing in the display device is the same as that of the device for circuit testing provided by the embodiment as described above, and the repeated descriptions are omitted.

The above display device may be a product or component having a function of display, such as a mobile phone, a tablet, a television, a display, a laptop, a digital frame or navigator.

As compared with the prior art, the device of circuit testing provided by the present disclosure has the following advantageous effects.

In the device of circuit testing provided by the present disclosure, the detection circuit formed by sequential connection of the first metal redundant track, the second metal redundant track, the third metal redundant track and the fourth metal redundant track may be acquired using the first metal redundant track and the fourth metal redundant track originally existed in the second bonding portion, the connection structure of which the first metal redundant track is correspondingly bonded to the second metal redundant track and the connection structure of which the fourth metal redundant track is correspondingly bonded to the third metal redundant track originally existed in the first bonding portion and the electrical connection of the second metal redundant track 63 with the third metal redundant track 64.

Since the first metal redundant track serves as an input terminal of the electrical detection signal and the fourth metal redundant track serves as a feedback output terminal of the electrical detection signal, if the fourth metal redundant track outputs an electrical feedback signal when the electrical detection signal is input to the first metal redundant track, the first bonding portion is electrically connected with the second bonding portion, that is, the metal tracks in the bonding areas of the first bonding portion and the second bonding portion are electrically connected with each other one to one, otherwise, the first bonding portion is electrically disconnected with the second bonding portion.

Therefore, the device for circuit testing provided by the embodiment of the present disclosure is capable of detecting the electrical connection state of the first bonding portion with the second bonding portion with the detection circuit, and the electrical connection of the first bonding portion with the second bonding portion depends on whether the metal tracks in the bonding areas of the first bonding portion and the second bonding portion are normally bonded to each other one to one, that is, the device for circuit testing provided by the present disclosure is capable of determining, with an electrical detection signal, whether the metal tracks in the bonding areas of the first bonding portion and the second bonding portion are normally bonded to each other one to one, and ensuring that the display device operates in the case when the first bonding portion and the second bonding portion are electrically connected with each other, according to a testing result acquired from the device for circuit testing, thereby avoiding the display device to be used in the case when the first bonding portion and the second bonding portion are electrically disconnected with each other and avoiding damage caused in that case.

In addition, the device for circuit testing provided by the present disclosure forms a detection circuit with the metal redundant tracks which are correspondingly bonded and originally disposed in the first bonding portion and the second bonding portion, and is capable of effectively detecting the electrical connection state of the metal tracks in the bonding areas of the first bonding portion and the second bonding portion without adding any additional external circuit, thereby simplifying the structure of the device for circuit testing.

Hereinabove are merely optional implementations of the present disclosure and the scope to be protected of the present disclosure is not limited to it. It should be noted that various improvements and alternatives are possible to those ordinary skilled in the art without departing from the technical principle of the present disclosure. All these improvements and alternatives will also fall into the protection scope of the present disclosure, and the protection scope of the present disclosure is defined as the appended claims.

What is claimed is:

1. A device for circuit testing, comprising a detection circuit configured to detect whether a first bonding portion and a second bonding portion are electrically conductive, wherein the detection circuit comprises
   a first metal redundant track configured to input an electrical detection signal;
   a second metal redundant track bonded to the first metal redundant track;
   a third metal redundant track electrically connected to the second metal redundant track; and
   a fourth metal redundant track bonded to the third metal redundant track, which is configured to output an electrical feedback signal when the first bonding portion and the second bonding portion are electrically conductive, wherein
   the first metal redundant track and the fourth metal redundant track is disposed within the second bonding portion, and the second metal redundant track and the third metal redundant track is disposed within the first bonding portion,
   wherein the first metal redundant track is bonded to the second metal redundant track via a first anisotropic conductive film and the third metal redundant track is bonded to the fourth metal redundant track via a second anisotropic conductive film.

2. The device for circuit testing according to claim 1, further comprising a detecting controller, wherein
   the detecting controller is electrically connected to the first metal redundant track, and the detecting controller is configured to output the electrical detection signal to the first metal redundant track;
   the detecting controller is electrically connected to the fourth metal redundant track, and the detecting controller is configured to when the first bonding portion and the second bonding portion are electrically conductive, receive the electrical feedback signal output by the fourth metal redundant track and determine whether the electrical feedback signal is satisfied with a requirement for a standard detecting signal; if satisfied, the detecting controller outputs a circuit testing result indicating that the first bonding portion and the second bonding portion are electrically conductive, if not satisfied or the electrical feedback signal is not received by the detecting controller during a predetermined time period, the detecting controller outputs a circuit testing result indicating that the first bonding portion and the second bonding portion are not electrically conductive, and
   wherein the standard detecting signal is an output signal generated when the electrical detection signal is faded within an allowable range.

3. The device for circuit testing according to claim 2, further comprising a status indicator signally communicated with the detecting controller; wherein
   the status indicator is configured to send a circuit detection request signal to the detecting controller, such that the detecting controller outputs the electrical detection signal according to the circuit detection request signal, and
   the status indicator is further configured to receive the circuit testing result output by the detecting controller.

4. The device for circuit testing according to claim 3, wherein the first bonding portion comprises a display panel, the second bonding portion comprises a printed circuit board, the status indicator is further signally communicated with the display controller and configured to output a display activation trigger signal to the display controller when a circuit testing result indicating that the display panel is electrically connected with the printed circuit board is received, such that the display controller controls display function of a display device to be activated, wherein the first metal redundant track and the fourth metal redundant track is disposed in the print circuit board, and the second metal redundant track and the third metal redundant track is disposed in the display panel.

5. The device for circuit testing according to claim 4, wherein the detecting controller, the status indicator and the display controller are integrated in the printed circuit board.

6. The device for circuit testing according to claim 3, wherein the status indicator is a timing control chip.

7. The device for circuit testing according to claim 1, wherein the electrical detection signal comprises an instantaneous electrical pulse signal.

8. A display device, comprising the device for circuit testing according to claim 1.

9. The display device according to claim 8, wherein the device for circuit testing further comprises a detecting controller, wherein
   the detecting controller is electrically connected to the first metal redundant track, and the detecting controller is configured to output the electrical detection signal to the first metal redundant track;

the detecting controller is electrically connected to the fourth metal redundant track, and the detecting controller is configured to when a first bonding portion is electrically connected with a second bonding portion, receive the electrical feedback signal output by the fourth metal redundant track and determine whether the electrical feedback signal is satisfied with a requirement for a standard detecting signal; if satisfied, the detecting controller outputs a circuit testing result indicating that the first bonding portion and the second bonding portion are electrically conductive, if not satisfied or the electrical feedback signal is not received by the detecting controller during a predetermined time period, the detecting controller outputs a circuit testing result indicating that the first bonding portion and the second bonding portion are not electrically conductive, and wherein the standard detecting signal is an output signal generated when the electrical detection signal is faded within an allowable range.

10. The display device according to claim 9, wherein the device for circuit testing further comprises a status indicator signally communicated with the detecting controller; wherein the status indicator is configured to send a circuit detection request signal to the detecting controller, such that the detecting controller outputs the electrical detection signal according to the circuit detection request signal, and the status indicator is further configured to receive the circuit testing result output by the detecting controller.

11. The display device according to claim 10, wherein the first bonding portion comprises a display panel, the second bonding portion comprises a printed circuit board, the status indicator is further signally communicated with the display controller and configured to output a display activation trigger signal to the display controller when a circuit testing result indicating that the display panel is electrically connected with the printed circuit board, such that the display controller controls display function of a display device to be activated, wherein the first metal redundant track and the fourth metal redundant track is disposed in the print circuit board, and the second metal redundant track and the third metal redundant track is disposed in the display panel.

12. The display device according to claim 10, wherein the status indicator comprises a timing control chip.

13. A method for circuit testing, comprising:

selecting a first metal redundant track and a fourth metal redundant track in a second bonding portion, selecting a second metal redundant track bonded to the first metal redundant track and a third metal redundant track bonded to the fourth metal redundant track in a first bonding portion, and electrically connecting the second metal redundant track to the third metal redundant track, so as to form a detection circuit;

inputting an electrical detection signal to the first metal redundant;

if the fourth metal redundant track outputs an electrical feedback signal when the electrical detection signal flows through the detection circuit, the first bonding portion and the second bonding portion being electrically conductive; or if the fourth metal redundant track does not output an electrical feedback signal when the electrical detection signal is input to the first metal redundant track, the first bonding portion and the second bonding portion being not electrically conductive, wherein the first metal redundant track is bonded to the second metal redundant track via a first anisotropic conductive film and the third metal redundant track is bonded to the fourth metal redundant track via a second anisotropic conductive film.

14. The method for circuit testing according to claim 13, wherein the first metal redundant track and the fourth metal redundant track are electrically connected to a detecting controller;

the detecting controller inputs the electrical detection signal to the first metal redundant track;

when the electrical detection signal flows through the detection circuit, the detecting controller receives the electrical feedback signal output by the fourth metal redundant track and determines whether the electrical feedback signal is satisfied with a requirement for a standard detecting signal; if satisfied, the detecting controller outputs a circuit testing result indicating that the first bonding portion and the second bonding portion are electrically conductive, if not satisfied or the electrical feedback signal is not received by the detecting controller during a predetermined time period, the detecting controller outputs a circuit testing result indicating that the first bonding portion and the second bonding portion are not electrically conductive, and wherein the standard detecting signal is an output signal generated when the electrical detection signal is faded within an allowable range.

15. The method for circuit testing according to claim 14, wherein the detecting controller is signally communicated with a status indicator;

the status indicator is configured to send a circuit detection request signal to the detecting controller, such that the detecting controller outputs the electrical detection signal according to the circuit detection request signal, and the detecting controller is configured to output the circuit testing result to the status indicator.

16. The method for circuit testing according to claim 15, wherein the first bonding portion comprises a display panel, the second bonding portion comprises a printed circuit board, the status indicator is further signally communicated with a display controller; and when a circuit testing result indicating that the display panel is electrically connected with the printed circuit board is received, the status indicator outputs a display activation trigger signal to the display controller such that the display controller controls display function of a display device to be activated.

17. The method for circuit testing according to claim 13, wherein the electrical detection signal comprises an instantaneous electrical pulse signal.

* * * * *